United States Patent
Liu et al.

(10) Patent No.: US 11,544,874 B2
(45) Date of Patent: Jan. 3, 2023

(54) SYSTEM AND METHOD FOR CALIBRATION OF MACHINE VISION CAMERAS ALONG AT LEAST THREE DISCRETE PLANES

(71) Applicant: Cognex Corporation, Natick, MA (US)

(72) Inventors: Gang Liu, Natick, MA (US); Guruprasad Shivaram, Wellesley, MA (US); Cyril C. Marrion, Jr., Acton, MA (US)

(73) Assignee: Cognex Corporation, Natick, MA (US)

( * ) Notice: Subject to any disclaimer, the term of this patent is extended or adjusted under 35 U.S.C. 154(b) by 10 days.

(21) Appl. No.: 16/882,273

(22) Filed: May 22, 2020

(65) Prior Publication Data

US 2021/0012532 A1     Jan. 14, 2021

Related U.S. Application Data

(63) Continuation of application No. 13/776,617, filed on Feb. 25, 2013, now Pat. No. 10,664,994.

(51) Int. Cl.
    *G06T 7/80*          (2017.01)
    *H04N 5/232*        (2006.01)
    (Continued)

(52) U.S. Cl.
    CPC ............... *G06T 7/80* (2017.01); *H04N 5/225* (2013.01); *H04N 5/232* (2013.01);
    (Continued)

(58) Field of Classification Search
CPC ...... H04N 5/225; H04N 5/232; H04N 17/002; H04N 5/23216; H04N 5/23267; G06T 7/80
See application file for complete search history.

(56) References Cited

U.S. PATENT DOCUMENTS

| 4,682,894 A | 7/1987 | Schmidt |
| 5,467,634 A | 11/1995 | Brady |

(Continued)

FOREIGN PATENT DOCUMENTS

| CN | 101216681 | 7/2008 |
| CN | 101221375 | 7/2008 |
| WO | 9940562 | 8/1999 |

OTHER PUBLICATIONS

Y. Motai and A. Kosaka, "Hand-Eye Calibration Applied to Viewpoint Selection for Robotic Vision," in IEEE Transactions on Industrial Electronics, vol. 55, No. 10, pp. 3731-3741, Oct. 2008, doi: 10.1109/TIE.2008.921255. (Year: 2008).*

(Continued)

*Primary Examiner* — Maria E Vazquez Colon
(74) *Attorney, Agent, or Firm* — Loginov & Associates, PLLC; William A. Loginov

(57) ABSTRACT

This invention provides a system and method for generating camera calibrations for a vision system camera along three discrete planes in a 3D volume space that uses at least two (e.g. parallel) object planes at different known heights. For any third (e.g. parallel) plane of a specified height, the system and method then automatically generates calibration data for the camera by interpolating/extrapolating from the first two calibrations. This alleviates the need to set the calibration object at more than two heights, speeding the calibration process and simplifying the user's calibration setup, and also allowing interpolation/extrapolation to heights that are space-constrained, and not readily accessible by a calibration object. The calibration plate can be calibrated at each height using a full 2D hand-eye calibration, or using a hand-eye calibration at the first height and then at a second height with translation to a known position along the height (e.g. Z) direction.

21 Claims, 5 Drawing Sheets

(51) Int. Cl.
*H04N 5/225* (2006.01)
*H04N 17/00* (2006.01)

(52) U.S. Cl.
CPC ....... *H04N 17/002* (2013.01); *H04N 5/23216* (2013.01); *H04N 5/23267* (2013.01)

(56) References Cited

U.S. PATENT DOCUMENTS

| | | | |
|---|---|---|---|
| 5,473,931 | A | 12/1995 | Brady |
| 5,978,521 | A | 11/1999 | Wallack |
| 6,542,249 | B1* | 4/2003 | Kofman .............. G01B 11/2513 |
| | | | 356/601 |
| 7,359,817 | B2 | 4/2008 | Ban |
| 7,577,286 | B2 | 8/2009 | Wilson |
| 7,831,088 | B2 | 11/2010 | Frakes |
| 7,945,349 | B2 | 5/2011 | Svensson |
| 2006/0023938 | A1 | 2/2006 | Ban |
| 2006/0195292 | A1* | 8/2006 | Krumm ..................... G01C 3/08 |
| | | | 702/150 |
| 2010/0161125 | A1 | 6/2010 | Aoba |
| 2011/0040514 | A1 | 2/2011 | Kunzmann |
| 2011/0280472 | A1* | 11/2011 | Wallack .................... G06T 7/80 |
| | | | 901/14 |
| 2012/0148145 | A1* | 6/2012 | Liu ........................... G06T 7/80 |
| | | | 382/154 |
| 2014/0240520 | A1 | 8/2014 | Liu |

OTHER PUBLICATIONS

Y. Motai and A. Kosaka, "Smartview: hand-eye robotic calibration for active viewpoint generation and object grasping," Proceedings 2001 ICRA. IEEE International Conference on Robotics and Automation (Cat. No.01CH37164), 2001, pp. 2183-2190 vol.3, doi: 10.1109/ROBOT.2001.932947. (Year: 2001).*

R. Y. Tsai and R. K. Lenz, "A new technique for fully autonomous and efficient 3D robotics hand/eye calibration," in IEEE Transactions on Robotics and Automation, vol. 5, No. 3, pp. 345-358, Jun. 1989.

Tsai, "A Versatile Camera Calibration Technique for High-Accuracy 3D Machine Vision Metrology Using Off-The-Shelf TV Cameras An", Aug. 1997, pp. 323-344, vol. RA-3, No. 4, Publisher: IEEE Journal of Robotics and Automation.

* cited by examiner

SYSTEM AND METHOD FOR CALIBRATION OF MACHINE VISION CAMERAS ALONG AT LEAST THREE DISCRETE PLANES

RELATED APPLICATION

This application is a continuation of co-pending U.S. patent application Ser. No. 13/776,617, filed Feb. 25, 2013, entitled SYSTEM AND METHOD FOR CALIBRATION OF MACHINE VISION CAMERAS ALONG AT LEAST THREE DISCRETE PLANES, the entire disclosure of which is herein incorporated by reference.

FIELD OF THE INVENTION

This invention relates to calibration of vision system cameras, and more particularly to systems and methods for calibrating vision system cameras with respect to a plurality of discrete object planes.

BACKGROUND OF THE INVENTION

In machine vision systems (also termed herein "vision systems"), one or more cameras are used to perform vision system process on an object or surface within an imaged scene. These processes can include inspection, decoding of symbology, alignment and a variety of other automated tasks. More particularly, a vision system can be used to inspect a flat work piece passing through an imaged scene. The scene is typically imaged by one or more vision system cameras that can include internal or external vision system processors that operate associated vision system processes to generate results. It is generally desirable to calibrate one or more cameras to enable it/them to perform the vision task(s) with sufficient accuracy and reliability. A calibration plate can be employed to calibrate the cameras.

A calibration plate is often provided as a flat object with distinctive patterns made visible on its surface. The distinctive pattern is generally designed with care and precision, so that the user can easily identify each visible feature in an image of the plate acquired by a camera. Some exemplary patterns include, but are not limited to, dot grids, line grids, or conceivably a honeycomb pattern, a checkerboard of triangles, etc. Characteristics of each visible feature are known from the plate's design, such as the position and/or orientation relative to a reference position and/or coordinate system implicitly defined within the design.

The design of a checkerboard pattern provides certain advantages in terms of accuracy and robustness in performing calibration, even in presence of perspective and lens distortions, partial damage to the pattern, and uneven lighting, among other non-ideal conditions. More particularly, in the two-dimensional (2D) calibration of a stationary object, determining the relative position of individual checkerboard tile corners by edges of the calibration checkerboards is typically sufficient to determine accuracy of the vision system, and as appropriate, provide appropriate correction factors to the camera's processor so that runtime objects are measured in view of such correction factors.

By way of further background on a general understanding of certain calibration principles, for a rigid body, such as a calibration plate, a motion can be characterized by a pair of poses: a starting pose immediately preceding a motion, and an ending pose immediately following the motion—a "pose" herein being defined as a set of numerical values to describe the state of a body, at any one particular instant in time, in some underlying coordinate system—a virtual characterization of the body. For example, in two dimensions, a rigid body can be characterized by three numbers: a translation in X, a translation in Y, and a rotation R. A pose in the context of a calibration plate describes how the calibration plate is presented to the camera(s), when there is relative motion between the camera(s) and the calibration plate. Typically, in a standard so-called "hand-eye calibration", a calibration plate is presented at a number of different poses to the camera(s), and each camera acquires an image of the calibration plate at each such pose. For machine vision hand-eye calibration, the calibration plate is typically moved to a plurality of predetermined poses at which cameras acquire respective images of the plate. The goal of such hand-eye calibration is to determine the rigid body poses of the camera(s) and calibration plate in the "motion coordinate system". The motion coordinate system can be defined in a variety of ways. The numbers in the poses (that specify where the calibration plate and/or cameras reside in the space) must be interpreted in an appropriate coordinate system. Once a single unified coordinate system is selected, the poses and motion are described/interpreted in that global coordinate system. This selected coordinate system is often termed the "motion coordinate system." Typically "motion" is provided by a physical device that can render physical motion, such as a robot arm, or a motion stage, such as a gantry. Note that either the plate can move relative to one or more stationary camera(s) or the camera(s) can move relative to a stationary plate. The controller of such a motion-rendering device employs numerical values (i.e. poses) to command the devices to render any desired motion, and those values are interpreted in a native coordinate system for that device. Note, although any motion coordinate system can be selected to provide a common, global coordinate system relative to the motion-rendering device and camera (s), it is often desirable to select the motion-rendering device's native coordinate system as the overall motion coordinate system.

Hand-eye calibration, thus, calibrates the system to a single motion coordinate system by rendering of motions (either moving the calibration plate or moving the cameras), and acquiring images before and after that motion to determine the effects of such motion on a moving object. By way of further background, this differs from standard "non-hand-eye" calibration in which a machine vision application is generally free of any motion rendering device. In such instances, the camera(s) are typically all calibrated relative to the coordinate system of the calibration plate itself, using one acquired image of the plate, which is in a particular position within the field of view of all cameras. The machine vision calibration software deduces the relative position of each camera from the image of the plate acquired by each camera. This calibration is said to "calibrate cameras to the plate", whereas a hand-eye calibration is said to "calibrate cameras to the motion coordinate system."

When the machine vision system employs hand-eye calibration, its software solves poses by correlating the observed motion effect in the images with the commanded motion (for which the commanded motion data is known). Another result of the calibration is a mapping between each pixel position in a camera's image and a physical position in the motion coordinate system, so that after finding a position in the image space, the position in the motion coordinate system can be translated and the motion-rendering device can be commanded to act upon it.

In various manufacturing processes, it is desired to align a flat work piece or more generally a work piece where the features of interest reside in discrete planes that are often parallel. More particularly, in assembly applications, one work piece is aligned to another work piece. One exemplary process entails inserting the cover glass of a cellular telephone or a tablet computer into its housing. Another exemplary process involves print applications in which the work piece is aligned to the process equipment, such as when screen printing of the cover glass of cellular telephones, tablet computers, or flat panel displays. In such manufacturing processes, work pieces must be aligned along the X-Y-axis directions of a reference plane, and also at different heights (i.e. along the orthogonal Z-axis). Some work pieces may possess multiple alignment features at multiple heights. Accurate and precise camera calibration is required for each height of interest to ensure that alignment is properly analyzed and verified by the vision system.

While the use of a three-dimensional (3D) vision system can be employed in such processes, it is contemplated that 2D vision systems can perform adequately where the planes of the object at each height remain parallel. Calibration is a procedure that is often time consuming and must occur within the space constraints of the work area. It is thus desirable in such "2.5D" arrangements, where height varies along otherwise parallel planes (i.e. the object experiences no rotation about the X or Y axes between differing height locations), to provide a system and method for accurately and conveniently calibrating the vision system camera. This system and method should desirably allow a measurement of a plurality of heights to be accurately calibrated-for, with a minimum of calibration plate manipulation and setup.

SUMMARY OF THE INVENTION

This invention overcomes disadvantages of the prior art by providing a system and method for generating camera calibrations for a vision system camera along three or more (i.e. at least three) discrete planes in a 3D volume space that uses at least two (illustratively parallel) object planes at different known heights. For any third specified plane (illustratively parallel to one or more of the first two planes at a specified height), the system and method then automatically generates accurate calibration data for the camera by a linear interpolation/extrapolation from the first two calibrations. Such technique is accurate in theory, and is free of the use of any explicit approximation. This alleviates the need to set the calibration plate or similar calibration object at more than two heights, speeding the calibration process and simplifying calibration setup for the user. Moreover, the illustrative system and method desirably enables calibration to heights typically not accessible by a calibration object (e.g. due to space constraints—such as an inside groove of a housing being imaged). The calibration plate can be calibrated at each height using a full 2D hand-eye calibration, or using a hand-eye calibration at the first height and then moving it to a second height with exclusive translation along the height (Z) direction (typically translation that is free of rotation about the Z axis as well as any translation or rotation with respect to the X and Y axes).

In an illustrative embodiment, a system and method for calibrating a vision system camera along at least three (or more) discrete planes is provided, and includes a vision system camera assembly having a field of view within a volume space. A calibration object is also provided, having calibration features that can be arranged as a checkerboard pattern on a planar plate. A calibration process performs, with acquired images of the calibration object, (a) a first calibration of the calibration object within a first plane of the volume space, and (b) a second calibration of the calibration object within a second plane of the volume space that separated along an axis of separation from the first plane. An interpolation/extrapolation process, operating along each 3D ray associated with each pixel position of interest, receives calibration data from the first calibration and the second calibration. It then generates calibration data for a third plane within the volume space separated along the axis from the first plane and the second plane. The interpolation/extrapolation process can be a conventional linear interpolation/extrapolation process in illustrative embodiments. Illustratively, at least two of the first plane, second plane and third plane can be parallel to each other. When non parallel, equations defining the planes are used in the interpolation process to determine the intersection point in each for a ray passing through each plane. Illustratively, at least one of the first calibration and the second calibration can comprise a hand-eye calibration relative to a motion coordinate system. Alternatively, the calibration object is moved between the first height and the second height in a known manner so that the new position of the object is known after the motion. By way of example, such known motion can occur exclusively along the perpendicular axis and either one of the first calibration or the second calibration employs a single image of the calibration object mapped to the motion coordinate system. The motion coordinate system can be defined with respect to motion directions of a motion-rendering device in a manufacturing arrangement that moves one of a first object and a second object. The motion-rendering device can be a manipulator or a motion stage that acts upon one of the objects. As such, the third plane is associated with a location along the axis at which the second object resides during assembly to the first object. The vision system camera assembly can consist of one or more vision system cameras that each have their own respective optical axis with a discrete orientation with respect to the volume space. Moreover, the vision system camera and motion coordinate system can be stationary with respect to each other, or in relative motion with respect to each other. It is contemplated generally, that motion can occur between the camera and the motion coordinate system regardless of whether the imaged object is, itself, in motion with respect to the motion coordinate system.

BRIEF DESCRIPTION OF THE DRAWINGS

The invention description below refers to the accompanying drawings, of which.

DETAILED DESCRIPTION

Figure 1:
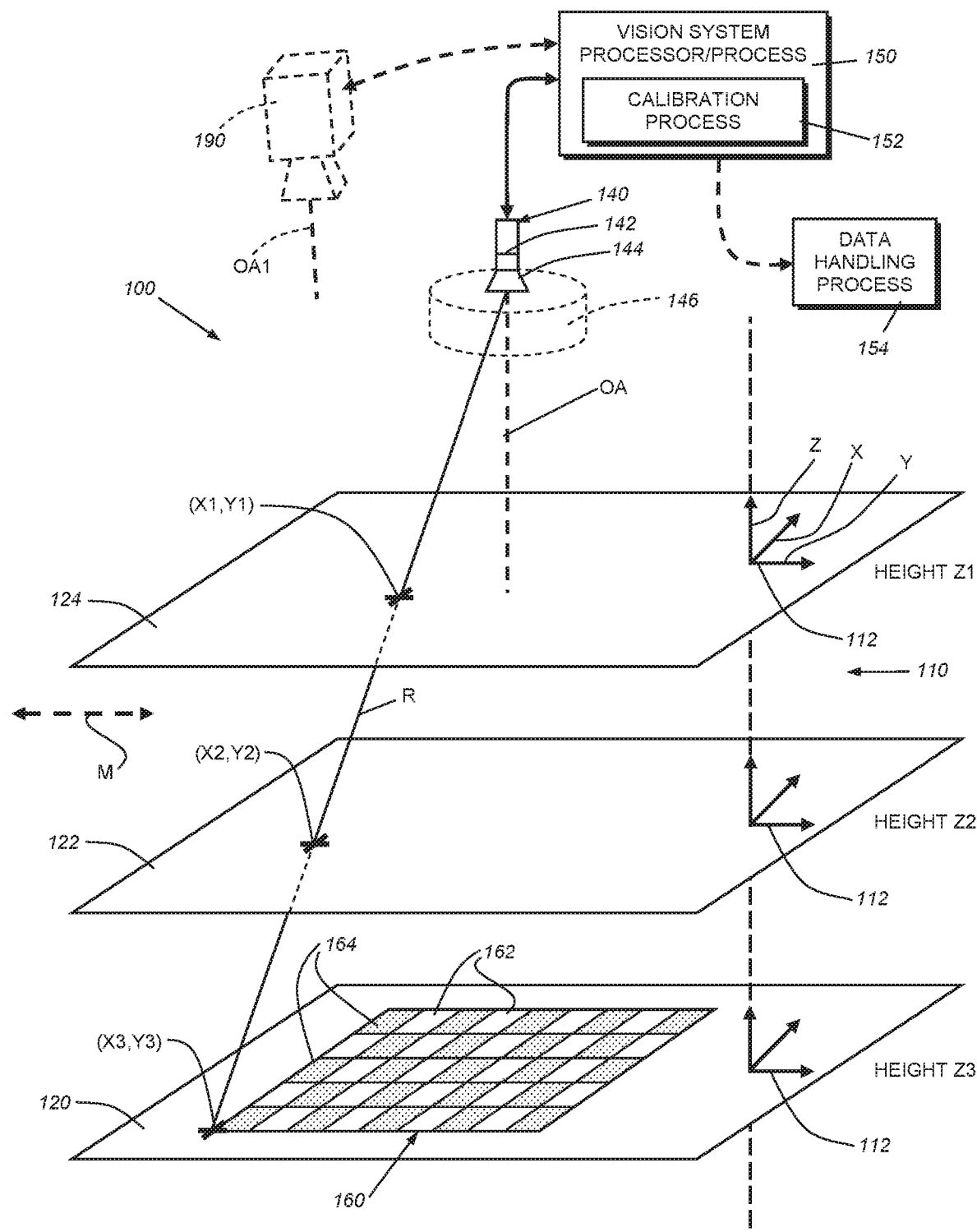
FIG. 1 is a schematic diagram of a vision system camera and associated processor arrangement showing the positioning of three or more, exemplary planes at their discrete heights with respect to the 3D motion coordinate system according to an illustrative embodiment.

FIG. 1 shows a schematic diagram of a vision system camera arrangement 100 that acquires images of a scene 110 within three dimensions as indicated by the depicted motion coordinate (X, Y and Z) axes 112. The scene 110 entails three or more (at least three) discrete elevations as depicted by planes 120, 122 and 124. For the purposes of illustration, each of the planes 120, 122 and 124 is parallel, in that only the Z-axis elevation or "height" varies and there is no rotation about either the corresponding X or Y axis. Accordingly, the scene can be defined as a 2.5-dimensional (2.5D) space. That is, there exists variation in the location of an object along the Z-axis, but within defined planes (120, 122, 124, etc.) that remain parallel to each other. In further embodiments, and as described below, the planes can be non-parallel and separated along a more generalized axis of separation at some location passing through each plane. This axis of separation in the illustrative example of FIG. 1 is a perpendicular axis through each exemplary plane.

As shown, the arrangement 100 includes at least one vision system camera 140 having an image sensor (or simply termed, "sensor") 142, such as a CMOS sensor, that receives light from the scene through a lens assembly 144. As described further below, the lens assembly can be a conventional pin-hole-model lens 144, with conventional focus and aperture settings, or a telecentric lens 146 (shown in phantom) according to a commercially available or custom design. The camera can define an optical axis OA that is parallel to the Z axis or oriented at an angle (i.e. non-parallel to) with respect to the Z axis.

Illustratively, the depicted straight line R defines a 3D ray intersecting the three differing, exemplary Z-height, parallel planes at different/discrete (X,Y) positions, i.e. (X1, Y1) on plane 124, (X2, Y2) on plane 122, and (X3, Y3) on plane 120. Note that more than three planes are in fact intersected and any other parallel plane can be the subject of a calibration operation (interpolation/extrapolation) as described hereinbelow. For pin-hole-model cameras, this ray R passes through the camera's optical center. For telecentric cameras, the rays are parallel to the optical axis. For both camera models, due to the camera's projective geometry, all three points are imaged at exactly the same pixel position on the camera's sensor. In general, each pixel position on the sensor corresponds to a 3D ray through space, which intersects the three or more planes at generally different (X, Y) positions within each plane. For pin-hole cameras, the 3D rays for different pixel positions converge at the camera's optical center, while for telecentric cameras, these 3D rays are parallel to the optical axis.

The camera's sensor 142 transmits acquired image data (e.g. color or grayscale pixel values) to a vision system processor and corresponding vision system process 150. The vision system processor/process 150 can be fully or partially contained within the camera housing, or can be provided in a separate, remote processing device, such as a PC, which is connected to the sensor assembly 142 (and any associated processing/pre-processing circuitry) by an appropriate wired or wireless link. The data generated by the vision system—for example alignment data, using edge detection and other conventional alignment techniques—can be used by downstream data-handling processes 154, including, but not limited to robot manipulation processes. A feedback loop can be established so that, as one or both object(s) are moved and images of the objects are acquired, the robot manipulator can be adjusted to define a path of accurate engagement between the objects. Within the vision system processor/process 150 is also contained a calibration process 152. The calibration process 152 generates and stores calibration values that are used to modify image data acquired by the camera from object features at differing locations along X, Y and Z so that it accurately represents the accurate location of such features in space and/or relative to other locations.

Figure 1A:
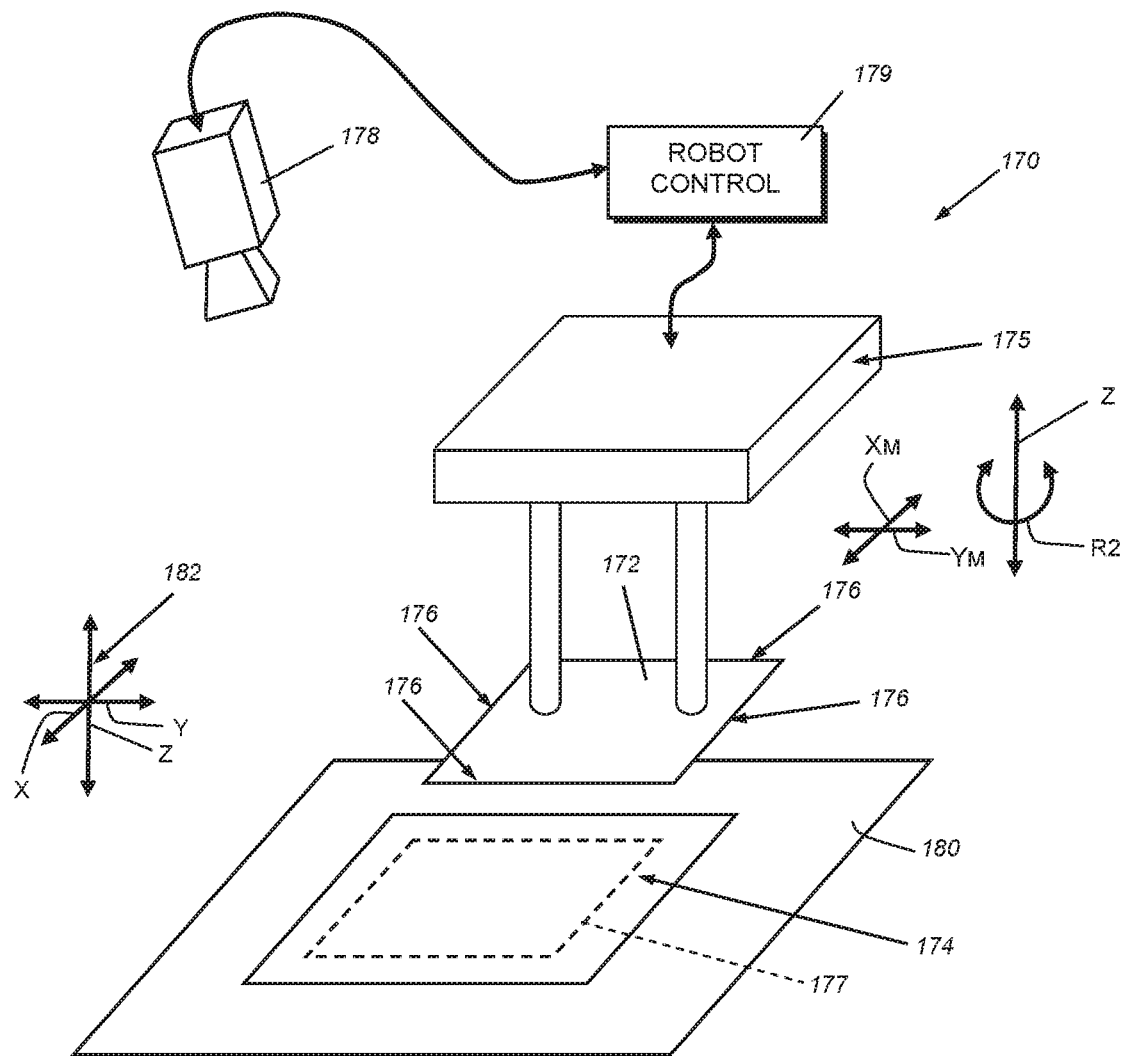
FIG. 1A is an exemplary manufacturing arrangement in which a first object is aligned with a second object via relative motion therebetween within exemplary parallel planes using the vision system according to the embodiment of FIG. 1.

The vision system arrangement 100 can be provided in a variety of manufacturing processes—for example as shown in the manufacturing arrangement/process 170 of FIG. 1A, in which a cover glass 172 is manipulated by a manipulator 175 with respect to a housing (e.g. a tablet computer, "smart" phone, etc.) 174. The glass 172 and the housing 174 of this example are each typically maintained within parallel planes as the vision system 178 seeks to align the edges 176 of the cover glass with an associated shelf (177—shown in phantom) of the housing 174. As described above, the object features can alternatively reside in non-parallel planes. Alignment information is transmitted to the manipulator's robot control assembly 179 to enable it to properly guide the glass 172 onto the housing for proper assembly. Alignment translation and rotation between the two objects occurs within the X-Y plane. The vision system 178 overseeing the exemplary objects requires accurate information on height so that it can appropriately move the cover glass along the Z axis from a position overlying the housing to a position that is engaged with the housing. In performing various manufacturing processes that employ vision systems to assist in proper manipulation of parts, it is highly desirable to find part features accurately (e.g. within microns) in the X and Y axes, and obtaining accurate height information makes possible such a high degree of precision. In the depicted example, the housing 174 is rotated and translated in X and/or Y using a motion stage 180, the cover glass 176 is translated in Z (and optionally translated and/or rotated in X and/or Y) using the manipulator 175. The manipulator 175 and/or the motion stage 180 can also rotate (curved arrow Rz) its respective part about the Z axis. More generally, the configuration of motion-rendering devices can be constructed and arranged so that assembly of the parts contained therein occurs with either (a) all motion provided to the first part (e.g. the cover glass); (b) all motion provided to the second part (e.g. the housing), or (c), as shown, certain motions provided to each part. In the depicted example, the motion stage 180 defines the systems motion coordinate system (X, Y and Z). However, this can be defined by the manipulator ($X_M$, $Y_M$ and Z) in alternate configurations, or where both motion rendering devices experience movement, a discrete motion coordinate system can be uniquely defined for each device using hand-eye calibration techniques, and both are mapped via hand-eye techniques to a unified reference coordinate system. This unified reference coordinate system can be based on either of the device's motion coordinate systems, or a completely separate coordinate system. As used herein, the term "motion coordinate system" shall also refer to a unified (global) coordinate system.

Note, as used herein the terms "process" and/or "processor" should be taken broadly to include a variety of electronic hardware and/or software based functions and components. Moreover, a depicted process or processor can be combined with other processes and/or processors or divided into various sub-processes or processors. Such sub-processes and/or sub-processors can be variously combined according to embodiments herein. Likewise, it is expressly contemplated that any function, process and/or processor here herein can be implemented using electronic hardware, software consisting of a non-transitory computer-readable medium of program instructions, or a combination of hardware and software.

For the purposes of calibration, using the calibration process 152, the user locates a calibration plate 160 within an X-Y plane of the space (for example, bottom plane 120). The plate 160 can define a variety of a geometric feature structures. Illustratively, a checkerboard plate consisting of a tessellated pattern of light (162) and dark 164 squares (or other contrasting structures—e.g. visible and non-visible, specular and opaque, etc.). These squares define at their boundaries a set of checkerboard tile corners that can be detected using conventional techniques—e.g. contrast-based edge detection and image pixel positions corresponding to each of the tile corners can be defined within each acquired image. Note that the depicted calibration plate is highly simplified, and in practice can be larger or smaller in area, and typically contains a significantly larger number or small (millimeter-sized or less) checkerboard squares.

It is expressly contemplated that a sensor based on a principle other than (or in addition to) light intensity can be used in alternate embodiments and that appropriate calibration objects and associated calibration patterns can be employed. The sensor is capable of resolving the calibration features based upon its principle of operation and the nature of the features being imaged. For example, a sensor that images in a non-visible wavelength (UV, IR) can be employed and some features project light in this non-visible wavelength. For the purposes of this description the terms "sensor", "camera" and "calibration object" shall be taken broadly to include non-intensity-based imaging systems and associated object features.

Figure 2:
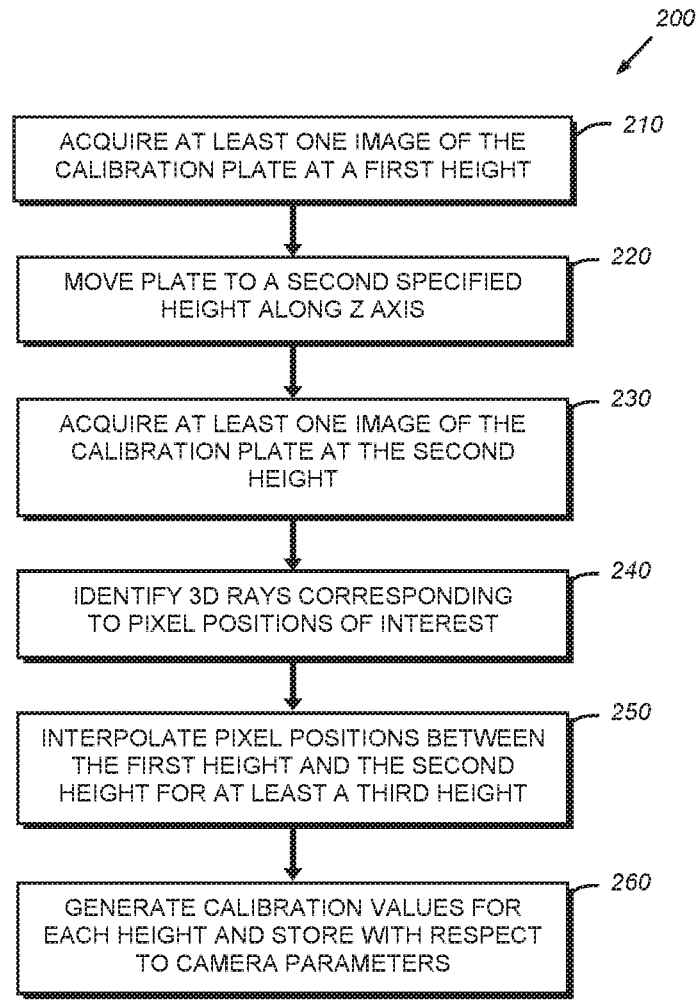
FIG. 2 is a flow diagram of an overall calibration procedure for use with the arrangement of FIG. 1, which employs images of a calibration plate (or similar object) at two discrete heights to allow interpolation of calibration parameters for a third or more heights.

With reference to FIG. 2, an illustrative calibration procedure 200 that is carried out using the vision system's calibration process 152 is now described in further detail using the depicted calibration plate 160. In step 210, the plate is placed within the camera field of view at a first height (e.g. in plane 120 and height Z3) and at least one image is acquired and stored for use in the calibration procedure. A plurality of images can be acquired with the calibration plate moved to different known locations relative to the X-Y plane if desired (for example in the case of a hand-eye calibration as described below).

The calibration plate 160 is then moved to a second parallel plane (e.g. plane 124 and height Z1) in step 220. At this height, one or more images of the calibration plate 160 are acquired in step 230 and stored in step 230.

In step 240 a 3D ray (e.g. ray R in FIG. 1) is computed for each pixel position of interest. This 3D ray's intersection with the planes at the first height and the second height are obtained from mapping the pixel position through the calibrations for the two heights, respectively. Then, in step 250, a linear interpolation (or extrapolation) step, according to known mathematical techniques, is performed for a third height of interest (e.g. plane 122 and height Z2) along the common Z axis. This linear interpolation/extrapolation step can be performed for any pixel position of interest, utilizing the fact that each such pixel position corresponds to a ray R in the 3D space that intersects all planes (e.g. at intersection (X1, Y1) on plane 124, at (X2, Y2) on plane 122, at (X3, Y3) on plane 120, etc.) parallel to the two planes 120 and 124 used in calibration. Illustratively, the interpolation/extrapolation for any third plane is based on a linear relationship between the ray's intersection point's X-Y positions and the plane's Z height. This interpolation/extrapolation allows the procedure 200 to generate calibration values for each interpolated height in step 260 that are stored as part of the camera assembly's parameters. These calibration values ensure that when an object is imaged at that height, the vision system accurately measures it there. Alternatively, it is expressly contemplated that the interpolation/extrapolation process can be used on-the-fly at runtime to find a physical position at any given height.

Note, it is contemplated that each physical space in the calibration procedure should be related linearly in a known manner. Illustratively, the vision system process (i.e. the alignment process) can define the physical space based upon the manufacturing processes' motion coordinate system (direction of motion for objects through the scene). This motion coordinate system typically resides in a 2D plane parallel to the flat parts to be aligned along the X-Y plane as shown. This 2D motion coordinate system is thus vertically extended/extruded orthographically along the depicted Z axis, which is perpendicular to the X-Y motion coordinate plane. At any specified Z-height, the physical coordinate space is the orthographic projection of the 2D motion coordinate system onto the parallel plane at the specified Z-height.

As described above, the planes can be oriented in a parallel arrangement or can be non-parallel. When non-parallel, the interpolation can employ known equations describing each of the two calibrated planes and the third to-be-calibrated plane. These equations are used to a ray's intersection with each of the specified planes in a manner clear to those of skill.

The movement and positioning of the calibration plate at each of the first height and the second height can be performed in a variety of manners. For example, the calibration plate can be located at a first height that is supported by the motion stage on which an object (e.g. a housing) is supported, and the second height can be spaced from the first height using an accurate spacing block, placed on the motion stage, which then supports the calibration plate at a higher second height than the first height. Alternatively, the manipulator can support the calibration plate and be moved accurately (potentially only along the Z axis between the first height and the second height).

Figure 3:
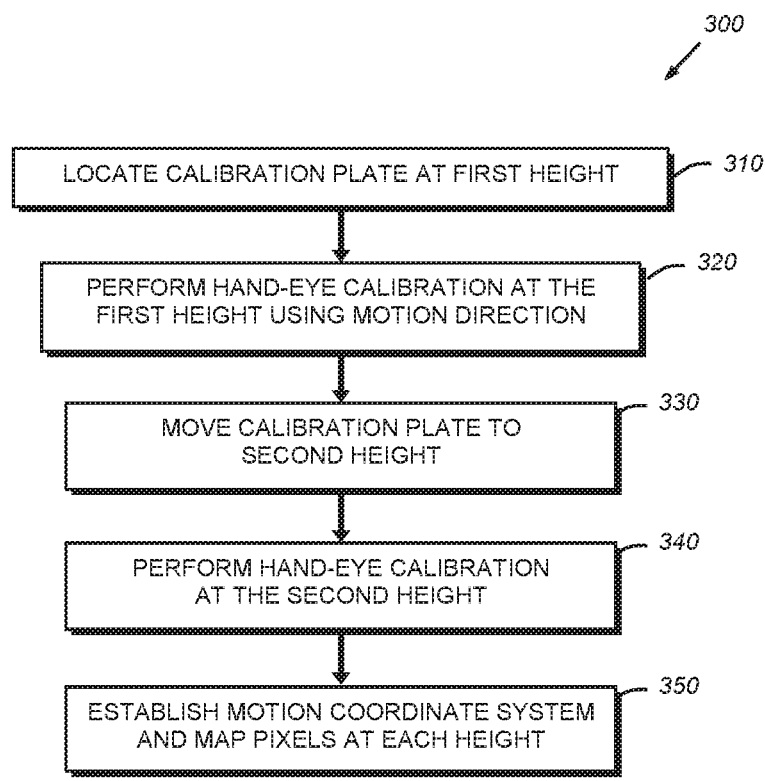
FIG. 3 is a flow diagram of a sub-procedure for performing a hand-eye calibration using the calibration plate at each of the two discrete heights.

With reference to the sub-procedure 300 of FIG. 3 (which can be part of procedure 200), in order to establish and maintain the motion coordinate system at each height, one approach is to perform a full 2D hand-eye calibration using the calibration plate at each height. This enables relative X-Y translation and/or rotation of the plate within the X-Y plane at the first height versus the second height—which can reduce the need for accurately restricting motion to exclusively Z-direction. In many manufacturing arrangements this flexibility can enhance the convenience of the overall calibration process (as described further below). In step 310, the calibration plate is located at the first height in one plane. In step 320, images are acquired of the calibration plate at each of at least two discrete positions within the plane in the manufacturing process. These images are stored, and used (step 350) in a 2D hand-eye calibration procedure to establish the motion coordinate system as well as a map of the relative 2D orientation of the plate with respect to this coordinate system. The calibration plate is then moved to the second height using the manipulator, a spacer, or the like to maintain it at the second height. The plate's relative X-Y position and/or rotation in the X-Y plane at the second height need not be identical to that of the plate at the first height. Images are then acquired of the plate in at least two different positions along the motion direction before and after motion (i.e. by the motion stage 180) and a full 2D hand-eye calibration procedure is performed to again establish the motion coordinate system and to map the calibration plate's orientation to this coordinate system (step 350).

Figure 4:
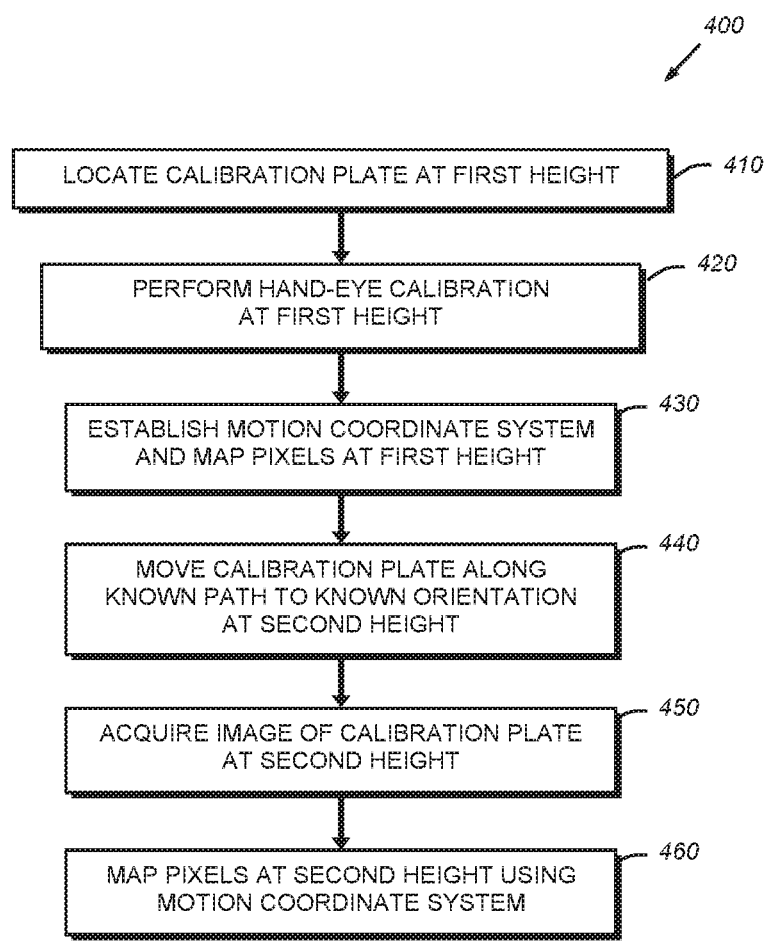
FIG. 4 is a flow diagram of an alternate sub-procedure for performing hand-eye calibration using the calibration plate at a first height and then accurately, and in a known manner, moving the plate to the second height so as to omit a second hand-eye calibration step.

An alternative sub-procedure 400 of the procedure 200 is shown in FIG. 4. In this procedure 400, at step 410, the calibration plate is again located at a first height. A hand-eye calibration is performed as described above at the first height at step 420. Based upon this hand-eye calibration, the motion coordinate system is established and mapped to the orientation of the calibration plate in step 430. Then, in step 440, the calibration plate is moved exclusively along the Z axis, free of any translation or rotation in or about the X or Y axes and also free of any rotation about the Z axis. This can be accomplished using a Z-axis motion stage that moves between the first height and the second height, in manufacturing arrangements where such a stage can be provided. Alternatively, the manipulator can hold the calibration plate and move exclusively along the Z direction. Note that such exclusive motion in the Z direction is an example of the broader concept in which the motion from one position to another occurs in a known manner so that the ending position and orientation is known to the system. It can be a motion that defines a second parallel or non-parallel plane with respect to the first plane. Once the calibration plate is moved to a second height/position, a single image is acquired and used (or one image is used from a plurality of acquired images) in step 450 to calibrate at the second height. Because the plate is in a known second position (for example, having moved in a manner free of any motion other than a pure translation along the Z direction), it can be mapped to the established motion coordinate system in step 460 and calibration values can be generated therefrom. The procedure 200 then interpolates/extrapolates for any other third parallel plane along the Z axis.

In alternate embodiments, the calibration plate's native coordinate system can be used as an equivalent to the motion coordinate system to define the vision system's global coordinate system. As such a single image at each height can be used for calibration and subsequent interpolation provided that the plate moves in a known manner (e.g. exclusively along the Z axis) between each of the first height and the second height.

As described above, the system and method of the illustrative embodiments can be implemented with a camera assembly (140) having a lens constructed according to either a pin-hole lens (144) model, or a telecentric lens (146) model. For telecentric cameras, the rays are parallel to the optical axis, and both pin-hole and telecentric camera models, due to each camera's projective geometry, all three (or more) points are imaged at exactly the same pixel position on the camera's sensor. Thus, the interpolation/extrapolation process along each optical ray is similar for either camera model.

It should be clear that the system and method for calibration of a vision system for use in processes involving objects positioned at a plurality of parallel planes provides an effective and more convenient technique for automatically (i.e. by the vision system's internal computational functions) generating calibration data at a wide range of heights, using a calibration plate or other structure positioned at two discrete heights. This simplifies and speeds the calibration processes, leading to less downtime in the manufacturing process and less user involvement in the physical aspects of calibration. Also since the illustrative system and method uses linear interpolation/extrapolation to generate accurate calibration data, it desirably enables calibration to heights and/or locations typically not accessible by a calibration object (e.g. due to space constraints—such as an inside groove of a housing being imaged).

It should be further clear that the principles herein, while described with respect to a single vision system camera, can be applied to each camera in a multi-camera assembly, either separately or treated together, as in standard hand-eye calibration practices. Illustratively a second camera 190 (shown in phantom in FIG. 1) having an optical axis OA1 at a discrete orientation relative to the first camera's axis OA is shown. This vision system camera 190 includes an internal and/or external vision system processor/process (represented also by block 150), and associated calibration process (represented also by block 152). This processor and/or process can be shared by multiple cameras (e.g. a PC-based processor/process or a master/slave processing arrangement having a master processor on one (or more camera(s) and slave processors on other camera(s)). Alternatively, each camera can generate its own calibration data with an associated processor/process and all data can be provided to a separate processor (e.g. a PC). Thus, the term "vision system camera assembly" should be taken broadly to include a variety of arrangements consisting of one or more discrete vision cameras (each typically containing its own optics package and associated image sensor). A version of its own accurate calibration data is generated for each camera by executing the extrapolation/interpolation process described above. In addition, it is expressly contemplated that the vision system camera (including a plurality of cameras) can be either stationary or in relative motion (double arrow M in FIG. 1) with respect to the motion coordinate system. Such relative motion for the camera(s) can occur regardless of whether the object is, itself, stationary or in relative motion with respect to the motion coordinate system. It is also contemplated that both the camera and the object (runtime object, calibration plate, etc.) can both be in relative motion or that only the object is in relative motion with respect to the motion coordinate system. The techniques described herein can be achieved in the presence of relative motion using standard theories and techniques of hand-eye calibration as they apply to moving cameras/objects.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, while the exemplary manufacturing process described herein relates to the manipulation of a cover glass with respect to the housing, a variety of other manufacturing processes that can be carried our within a 2.5D space are contemplated—for example that placement of circuit chips on a circuit board, the installation of window glass within a frame, etc. Furthermore, while two discrete heights are used in the interpolation/extrapolation procedure, it is contemplated that calibration of the plate at further physical heights can occur to increase accuracy. Additionally, the first height and the second height need not define a lower and a higher plane, respectively, and can alternatively define a higher and lower plane, calibrated in such order. Likewise, any third-height plane for which calibration data is generated by linear interpolation/extrapolation need not reside between the first height and the second height, so long the interpolation can produce a reliable result for a plane at that distance from the camera's image plane. More generally the terms "interpolation", "extrapolation" and/or "interpolation/extrapolation" are used generally herein to refer to linear interpolation and/or extrapolation, but can also define similar mathematical procedures and/or additional procedures used in conjunction with a traditional linear interpolation and/or extrapolation process. Additionally, while the use of one calibration object is described, it is expressly contemplated that a plurality of calibration objects (having either similar/the same or different feature patterns) can be employed in further embodiments. Thus, "at least one" calibration object is employed herein. Also, as used herein various directional and orientation terms such as "vertical", "horizontal", "up", "down", "bottom", "top", "side", "front", "rear", "left", "right", and the like are used only as relative conventions and not as absolute orientations with respect to a fixed coordinate system, such as gravity. Accordingly, this description is meant to be taken only by way of example, and not to otherwise limit the scope of this invention.

What is claimed is:

1. A system for calibrating a vision system camera along at least three discrete planes comprising:
    a vision system camera assembly having a field of view within a volume space;
    at least one calibration object having calibration features;
    a calibration process that, with acquired images of the calibration object, performs (a) a first hand-eye calibration using the calibration object at a first position within a first plane of a first height of the volume space, and (b) a second hand-eye calibration using the calibration object at a second position within a second plane of a second height of the volume space that is separated from the first plane such that the first position within the first plane is distinct relative to the second position within the second plane; and
    an interpolation/extrapolation process that is associated with the calibration process that receives calibration data from the first hand-eye calibration and the second hand-eye calibration and therewith generates three-dimensional (3D) calibration data for within the volume space.

2. The system as set forth in claim 1, wherein the first plane and the second plane are parallel.

3. The system as set forth in claim 1, wherein the calibration object in the second position is at least one of: translated within the second plane relative to the first position within the first plane; or rotated within the second plane relative to the first position within the first plane.

4. The system as set forth in claim 1, wherein a position of interest lies on a third plane that is tilted relative to at least one of the first plane or the second plane.

5. The system as set forth in claim 1, further comprising a ray identification process that computes a plurality of 3D rays corresponding to a plurality of pixels of the vision system camera.

6. The system as set forth in claim 5, wherein each of the plurality of pixels of the vision system camera corresponds to a respective 3D ray of the plurality of 3D rays.

7. The system as set forth in claim 5, wherein at least one respective 3D ray intersects with the first plane at a first (X,Y) position and the second plane at a second (X,Y) position.

8. A system for calibrating a vision system camera along at least three discrete planes comprising:
    a vision system camera assembly having a field of view within a volume space;
    at least one calibration object having calibration features;
    a calibration process that, with acquired images of the calibration object, performs (a) a first hand-eye calibration using the calibration object at a first position within a first plane of a first height of the volume space, and (b) a second hand-eye calibration using the calibration object at a second position within a second plane of a second height of the volume space that is separated from the first plane such that the first position within the first plane is distinct relative to the second position within the second plane; and
    an interpolation/extrapolation process that is associated with the calibration process that receives calibration data from the first hand-eye calibration and the second hand-eye calibration and therewith generates three-dimensional (3D) calibration data for within the volume space, wherein the interpolation/extrapolation process defines a linear interpolation/extrapolation process that identifies a linear relationship between the first (X,Y) position, the second (X,Y) position, and a position of interest.

9. The system as set forth in claim 8, wherein the linear interpolation/extrapolation process generates the calibration data for the position of interest and for a plurality of interpolated heights.

10. The system as set forth in claim 8, wherein the linear interpolation/extrapolation process generates the calibration data for the position of interest during runtime.

11. A system for calibrating a vision system camera along at least three discrete planes comprising:
    a vision system camera assembly having a field of view within a volume space;
    at least one calibration object having calibration features;
    a calibration process that, with acquired images of the calibration object, performs (a) a first hand-eye calibration using the calibration object at a first position within a first plane of a first height of the volume space, and (b) a second hand-eye calibration using the calibration object at a second position within a second plane of a second height of the volume space that is separated from the first plane such that the first position within the first plane is distinct relative to the second position within the second plane; and
    an interpolation/extrapolation process that is associated with the calibration process that receives calibration data from the first hand-eye calibration and the second hand-eye calibration and therewith generates calibration data for a height of interest.

12. The system as set forth in claim 11, wherein the calibration data for the height of interest comprises 3D calibration data.

13. The system as set forth in claim 11, wherein the first plane and the second plane are parallel.

14. The system as set forth in claim 11, wherein the calibration object in the second position is at least one of: translated within the second plane relative to the first position within the first plane; or rotated within the second plane relative to the first position within the first plane.

15. The system as set forth in claim 11, wherein the height of interest lies on a third plane that is tilted relative to at least one of the first plane or the second plane.

16. The system as set forth in claim 11, further comprising a ray identification process that computes a plurality of 3D rays corresponding to a plurality of pixels of the vision system camera.

17. The system as set forth in claim 16, wherein each of the plurality of pixels of the vision system camera corresponds to a respective 3D ray of the plurality of 3D rays.

18. The system as set forth in claim 16, wherein at least one respective 3D ray intersects with the first plane at a first (X,Y) position and the second plane at a second (X,Y) position.

19. A system for calibrating a vision system camera along at least three discrete planes comprising:
- a vision system camera assembly having a field of view within a volume space;
- at least one calibration object having calibration features;
- a calibration process that, with acquired images of the calibration object, performs (a) a first hand-eye calibration using the calibration object at a first position within a first plane of a first height of the volume space, and (b) a second hand-eye calibration using the calibration object at a second position within a second plane of a second height of the volume space that is separated from the first plane such that the first position within the first plane is distinct relative to the second position within the second plane; and
- an interpolation/extrapolation process that is associated with the calibration process that receives calibration data from the first hand-eye calibration and the second hand-eye calibration and therewith generates calibration data for a height of interest, wherein the interpolation/extrapolation process defines a linear interpolation/extrapolation process that identifies a linear relationship between the first (X,Y) position, the second (X,Y) position, and the height of interest; and
- a ray identification process that computes a plurality of 3D rays corresponding to a plurality of pixels of the vision system camera, wherein at least one respective 3D ray intersects with the first plane at a first (X,Y) position and the second plane at a second (X,Y) position.

20. The system as set forth in claim 19, wherein the linear interpolation/extrapolation process generates the calibration data for the height of interest and for a plurality of interpolated heights.

21. The system as set forth in claim 19, wherein the linear interpolation/extrapolation process generates the calibration data for the height of interest during runtime.

* * * * *